(12) United States Patent
Mori et al.

(10) Patent No.: US 8,347,383 B2
(45) Date of Patent: Jan. 1, 2013

(54) NETWORK MONITORING APPARATUS, NETWORK MONITORING METHOD, AND NETWORK MONITORING PROGRAM

(75) Inventors: Hideo Mori, Tokyo (JP); Kazuaki Chikira, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 369 days.

(21) Appl. No.: 12/677,935

(22) PCT Filed: Sep. 29, 2008

(86) PCT No.: PCT/JP2008/067658
§ 371 (c)(1),
(2), (4) Date: Mar. 12, 2010

(87) PCT Pub. No.: WO2009/041686
PCT Pub. Date: Apr. 2, 2009

(65) Prior Publication Data
US 2010/0218250 A1    Aug. 26, 2010

(30) Foreign Application Priority Data
Sep. 28, 2007    (JP) .................................. 2007-254681

(51) Int. Cl.
*H04L 29/06* (2006.01)
(52) U.S. Cl. ......................................... 726/22; 713/188
(58) Field of Classification Search ................. 726/22; 713/188
See application file for complete search history.

(56) References Cited

U.S. PATENT DOCUMENTS

| | | | |
|---|---|---|---|
| 6,513,122 B1 * | 1/2003 | Magdych et al. ............... | 726/23 |
| 6,971,028 B1 * | 11/2005 | Lyle et al. ........................ | 726/25 |
| 7,062,782 B1 * | 6/2006 | Stone et al. ...................... | 726/22 |
| 7,389,537 B1 * | 6/2008 | Callon et al. .................... | 726/22 |
| 7,525,921 B1 * | 4/2009 | Yi Dar Lo ....................... | 370/241 |
| 7,725,775 B2 * | 5/2010 | Tsuzuki ........................... | 714/44 |
| 7,743,134 B2 * | 6/2010 | Kohler et al. ................... | 709/224 |

(Continued)

FOREIGN PATENT DOCUMENTS

JP    2003 298652    10/2003

(Continued)

OTHER PUBLICATIONS

Extended European Search Report issued May 2, 2011, in Patent Application No. 08833924.7.

(Continued)

*Primary Examiner* — Michael Pyzocha
(74) *Attorney, Agent, or Firm* — Oblon, Spivak, McClelland, Maier & Neustadt, L.L.P.

(57) ABSTRACT

A traffic monitoring system (10) monitors traffics flowing through a network (100); when an abnormal traffic is detected, identifies an attack source network, a source of an attack, on the basis of attack source information indicating a source device from which the abnormal traffic is transmitted, which is obtained by an analysis of the abnormal traffic, and also identifies an attack destination network, a destination of the attack, on the basis of attack destination information indicating a destination device to which the abnormal traffic is to be transmitted, which is obtained by the analysis of the abnormal traffic; notifies an administrator of the attack source network of the attack source information by acquiring administrator information corresponding to the identified attack source network; and notifies an administrator of the attack destination network of the attack destination information by acquiring administrator information corresponding to the identified attack destination network.

12 Claims, 8 Drawing Sheets

U.S. PATENT DOCUMENTS

| | | | |
|---|---|---|---|
| 2002/0032774 A1 | 3/2002 | Kohler, Jr. et al. | |
| 2002/0078202 A1 | 6/2002 | Ando et al. | |
| 2003/0145228 A1* | 7/2003 | Suuronen et al. | 713/201 |
| 2004/0098623 A1* | 5/2004 | Scheidell | 713/201 |
| 2004/0117478 A1* | 6/2004 | Triulzi et al. | 709/224 |
| 2004/0193892 A1* | 9/2004 | Tamura et al. | 713/182 |
| 2004/0255155 A1* | 12/2004 | Stading | 713/201 |
| 2005/0060562 A1 | 3/2005 | Bhattacharya et al. | |
| 2005/0091538 A1* | 4/2005 | Hoche et al. | 713/201 |
| 2005/0198519 A1* | 9/2005 | Tamura et al. | 713/188 |
| 2006/0156402 A1* | 7/2006 | Stone et al. | 726/22 |
| 2006/0195508 A1* | 8/2006 | Bernardin et al. | 709/203 |
| 2007/0064697 A1* | 3/2007 | Nesbitt et al. | 370/392 |
| 2007/0245174 A1* | 10/2007 | Gale et al. | 714/57 |
| 2007/0245416 A1* | 10/2007 | Dickinson et al. | 726/14 |
| 2008/0005312 A1* | 1/2008 | Boss et al. | 709/224 |
| 2008/0016208 A1* | 1/2008 | Treinen | 709/224 |
| 2008/0016562 A1 | 1/2008 | Keeni | |
| 2008/0059596 A1* | 3/2008 | Ogawa | 709/207 |

FOREIGN PATENT DOCUMENTS

| | | |
|---|---|---|
| JP | 2004 30286 | 1/2004 |
| JP | 2005 12606 | 1/2005 |
| JP | 2006 67078 | 3/2006 |
| JP | 2006 115432 | 4/2006 |
| JP | 2006 254287 | 9/2006 |

OTHER PUBLICATIONS

Glenn Mansfield, et al., "Towards trapping wily intruders in the large", Computer Networks, vol. 34 No. 4, XP 4304744, Oct. 1, 2000, pp. 659-670.

* cited by examiner

FIG.3

ADMINISTRATOR INFORMATION TABLE (23)

| ADMINIS-TRATOR ID | NAME | LOGIN ID | PASS-WORD | E-MAIL ADDRESS | E-MAIL NOTIFICATION FLAG |
|---|---|---|---|---|---|
| K01 | TOKKYO TARO | aaa | abc01 | 01@sp1 | TRUE |
| K02 | YAMADA HANAKO | bbb | bjp02 | 02@sp2 | FALSE |
| ... | ... | ... | ... | ... | ... |

NETWORK-PROVIDER INFORMATION TABLE (22)

| PROVIDER ID | PROVIDER NAME | ADDRESS | PHONE NUMBER | ADMINIS-TRATOR ID | NETWORK ID |
|---|---|---|---|---|---|
| 001 | ISP 1 | TOKYO-TO OO | 03-xxx-xxxx | K01 | N01 |
| 002 | ISP 2 | OSAKA-FU ×× | 06-xxx-xxxx | K02 | N02 |
| ... | ... | ... | ... | ... | ... |

NETWORK INFORMATION TABLE (24)

| NETWORK ID | TYPE OF ADDRESS | ADDRESS | FILTER ID |
|---|---|---|---|
| N01 | NETWORK | 192.168.0.0/24 | F01 |
| N02 | MAC | 00:11:22:AA:BB:CC | F02 |
| ... | ... | ... | ... |

FILTER INFORMATION TABLE (25)

| FILTER ID | FILTER NAME | FILTER CONDITION | THRESHOLD |
|---|---|---|---|
| F01 | TRAFFIC MONITORING | HTTP,HTTPS | 200 t/s |
| F02 | TRAFFIC MONITORING | TCP,UDP | 300 t/s |
| ... | ... | ... | ... |

FIG.4

| NO. | TYPE OF ATTACK | ATTACK START TIME | ATTACK FINISH TIME | NETWORK PROVIDER | NET-WORK | DETAILED INFORMATION BUTTON |
|---|---|---|---|---|---|---|
| 1 | TCP ALL | 2007/07/30 14:57:30 | — | AAA PROVIDER | KANTO-AREA NW | DETAILED INFORMATION |
| 2 | ICMP | 2007/07/28 21:54:00 | 2007/07/28 22:03:23 | BBB CORPO-RATION | XXX NET | DETAILED INFORMATION |
| 3 | TCP ALL | 2007/07/28 12:30:21 | 2007/07/28 15:10:00 | ABC PROVIDER | KANSAI-AREA NW | DETAILED INFORMATION |
| ⋮ | ⋮ | ⋮ | ⋮ | ⋮ | ⋮ | ⋮ |

FIG.5

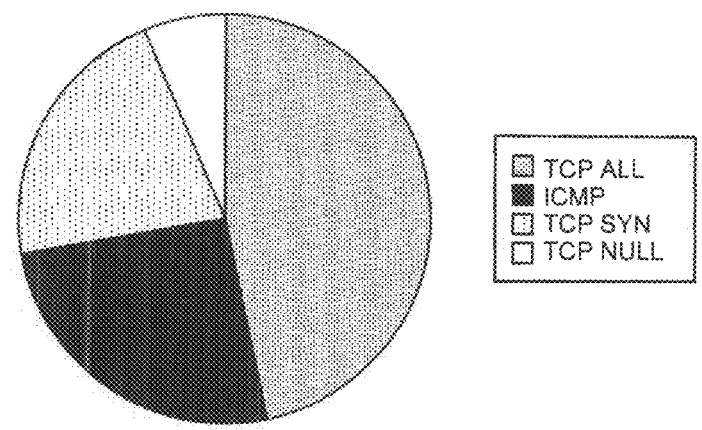

DISTRIBUTION BY TYPE OF ATTACK

☐ TCP ALL
■ ICMP
☐ TCP SYN
☐ TCP NULL

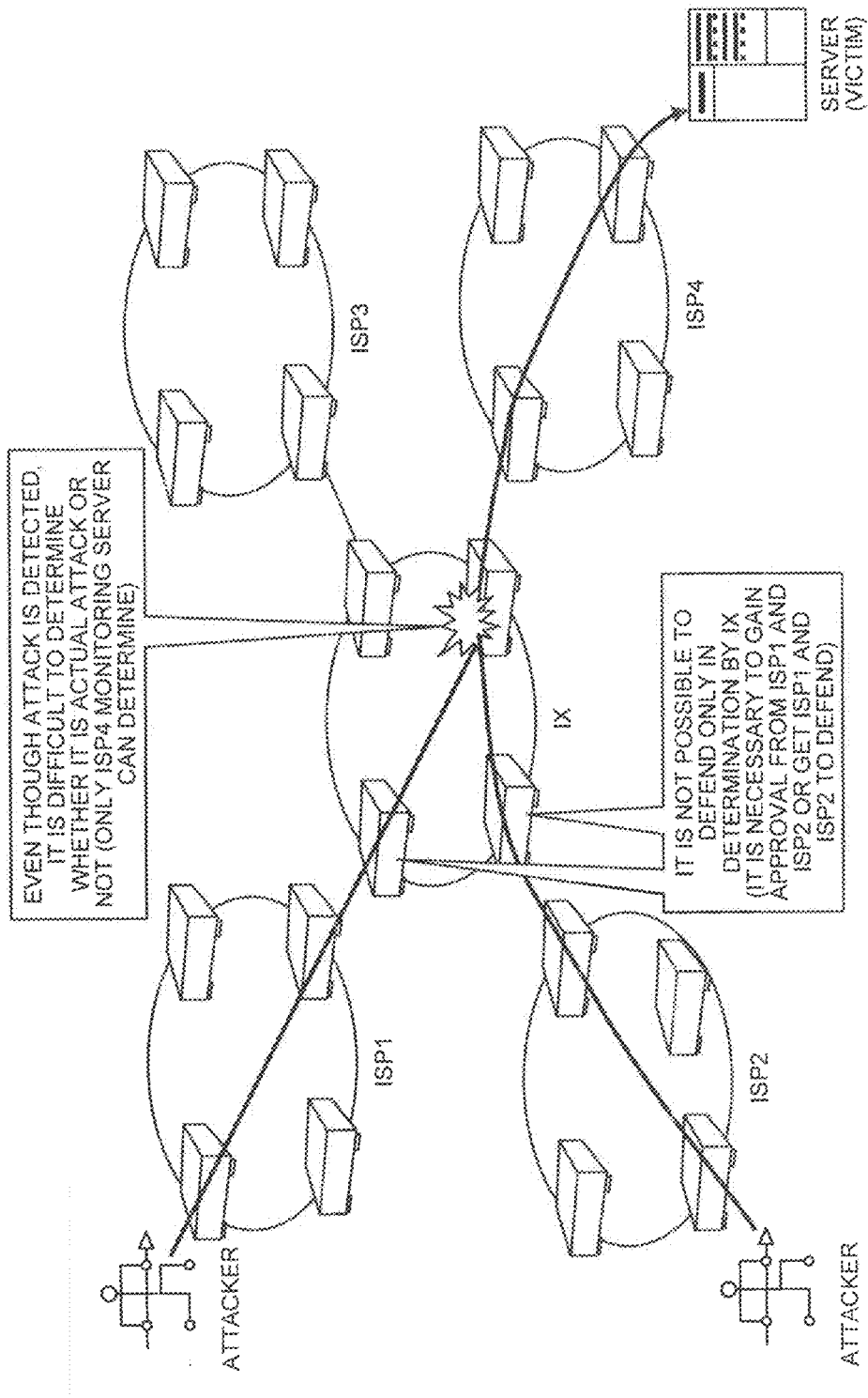

NETWORK MONITORING APPARATUS, NETWORK MONITORING METHOD, AND NETWORK MONITORING PROGRAM

TECHNICAL FIELD

The present invention relates to a network monitoring apparatus, a network monitoring method, and a network monitoring program for detecting an abnormal traffic that is connected to a network to which the network monitoring apparatus is connected and attacks a network system in the network system in which the network to which a plurality of devices are connected and a plurality of other networks configured in the same manner as the network are interconnected.

BACKGROUND ART

A DoS (Denial of Service) attack and a DDoS (Distributed Denial of Service) attack have been conventionally known as an attack made via a network on a device connected to the network.

The DoS attack is aimed at blocking a service provided by a device (e.g., a server or the like) connected to the network, and how to block and reject the service is that an attacker sends a large amount of IP packets to the device to cause resources of the network and the device to be consumed. The DDoS attack is that a computer installed with an attack program on a system thereof by unauthorized access or the like, which is so-called a "zombie", implements attacks on devices on a targeted network at the same time.

The number of DoS attacks and DDoS attacks has increased in recent years, so to provide services stably through the Internet that has been already becoming a social infrastructure, it is important to implement measures against such DoS attacks and DDoS attacks.

As a method for defending against such DoS attacks and DDoS attacks, for example, there is a technology disclosed in Patent document 1 (Japanese Laid-open Patent Publication No. 2006-67078) and the like. Specifically, in Patent document 1, a router that has detected an attack (i.e., a closest router to a device subjected to an attack) transfers attack detection information to an administration device. When receiving the transfer, the administration device analyzes the received attack detection information, and gives each router an instruction to defend against the attack on the basis of a result of the analysis.

Patent document 1: Japanese Laid-open Patent Publication No. 2006-67078

DISCLOSURE OF INVENTION

Problem to be Solved by the Invention

However, the above-described conventional technology has a problem that when a device managed by a provider of other network interconnected to a network is attacked, it is difficult to determine whether it is an attack or not, thus it is not possible to quickly notify the provider of the other network that the device is subjected to the attack. As a result, if it is actually an attack, a provider of the network cannot provide protection against the attack, so the provider of the network needs to communicate with the provider of the other network subjected to the attack to let the provider of the other network defend against the attack under the determination of the provider of the other network; thus, it takes time to defend against the attack.

This problem is concretely explained here. As shown in FIG. 9, the conventional technology (Patent document 1) is effective in a provider of a network that directly accommodates a device subjected to an attack. However, the latest Internet is made up of various networks, and the networks are interconnected. In other words, devices making up the Internet, such as routers, are run/managed by various network providers.

To cite an example, as shown in FIG. 10, it will be assumed that in a network system in which five networks, an ISP (Internet Service Provider) 1, an ISP2, an ISP3, an ISP4, and an IX (Internet eXchange), are interconnected, an attacker attacks the ISP1 and a server of the ISP4 via the IX, and other attacker attacks the ISP2 and the server of the ISP4 via the IX. In this case, even though the attack is detected, whether it is an attack or not cannot be determined on the IX side (only the ISP4 managing the server can determine); as a result, it is not possible to defend against the attack only in the determination of the IX side.

Namely, when content that is very high in the popularity stakes is published on a Web server managed by a provider of other network interconnected to a network, an enormous amount of packets flow; it is difficult for a provider of the network to determine whether they are authenticated packets or due to a DDoS attack. Furthermore, if an attack on a device managed by the provider of the other network occurs, the provider of the network is not at liberty to provide protection against the attack in the determination of the provider of the network, so the provider of the network communicates with the provider of the other network by e-mail or phone to let the provider of the other network defend against the attack. As a result, it takes time to take action against the attack since the attack has occurred, and the device has been attacked all that time. Moreover, if a wide-scale attack occurs, not only a device subjected to the attack and a provider of other network interconnected to a network and accommodating the device are damaged, but also a provider of the network and providers of networks interconnected to the network may be affected.

In this manner, in the conventional technology, when a device managed by a provider of other network interconnected to a network is attacked, it is difficult to determine whether it is an attack or not, and if it is actually an attack, a provider of the network cannot provide protection against the attack, so the provider of the network needs to communicate with the provider of the other network subjected to the attack to let the provider of the other network defend against the attack under the determination of the provider of the other network; thus, it takes time to defend against the attack.

The present invention has been made to solve the problem of the conventional technology described above, and an object of the present invention is to provide a network monitoring apparatus, a network monitoring method, and a network monitoring program capable of quickly notifying an attack source network and an attack destination network of attack information if a device managed by a provider of other network interconnected to a network to which the network monitoring apparatus is connected is attacked.

Means for Solving Problem

To solve the problems and achieve the object, the invention set forth in claim 1 is a network monitoring apparatus, connected to a network to which a plurality of devices are connected, for detecting an abnormal traffic that attacks a network system, the network system being configured so that the network and a plurality of other networks configured in the same manner as the network are interconnected. The network monitoring apparatus includes a network-information storage unit that stores therein network information for identifying a plurality of networks making up the network system, the network information being associated with the respective networks; an administrator-information storage unit that stores therein administrator information on administrators who manage the respective networks stored in the network-information storage unit, the administrator information being associated with the respective networks; an attack-source-network identifying unit that monitors traffics flowing through the network, the attack-source-network identifying unit identifying, when an abnormal traffic is detected, an attack source network which is a source of an attack, from the network information stored in the network-information storage unit on the basis of attack source information indicating a source device from which the abnormal traffic is transmitted and which is specified by an analysis of the abnormal traffic; an attack-destination-network identifying unit that identifies, when the abnormal traffic is detected, an attack destination network which is a destination of the attack, from the network information stored in the network-information storage unit on the basis of attack destination information indicating a destination device to which the abnormal traffic is to be transmitted and which is specified by the analysis of the abnormal traffic; and an attack notifying unit that acquires, from the administrator-information storage unit, administrator information corresponding to the attack source network identified by the attack-source-network identifying unit, and notifies the attack source information with use of the acquired administrator information, the attack notifying unit acquiring, from the administrator-information storage unit, administrator information corresponding to the attack destination network identified by the attack-destination-network identifying unit, and notifying the attack destination information with use of the acquired administrator information.

The invention set forth in claim 2 further includes a network-administrator notifying unit that notifies an administrator device of the network of the attack source information and attack destination information which are obtained by the analysis of the abnormal traffic with use of administrator information of the network stored in the administrator-information storage unit.

The invention set forth in claim 3 further includes an attack-information storage unit that stores therein the attack source information and attack destination information which are obtained by the analysis of the abnormal traffic.

The invention set forth in claim 4 further includes a statistical-information creating unit that creates attack statistical information from the attack source information and attack destination information which are stored in the attack-information storage unit.

The invention set forth in claim 5 further includes an attack-information browsing unit that outputs, when receiving a request for browsing of the attack source information and attack destination information which are stored in the attack-information storage unit and the statistical information created by the statistical-information creating unit from an administrator device corresponding to administrator information stored in the administrator-information storage unit, only information corresponding to a network managed by the administrator device to the administrator device after certifying that the administrator device is an authenticated device.

In the invention set forth in claim 6, the plurality of other networks in the network system are interconnected via the network so as to communicate with one another, the network-information storage unit stores therein, as the network information, at least any one of a Media Access Control address, a network address, a Virtual Local Area Network identification, and an interface of a router, which are information for identifying the respective plurality of networks, the attack-source-network identifying unit monitors traffics flowing through the network, and identifies, when the abnormal traffic is detected, the attack source network from the network-information storage unit on the basis of the network information indicating the source device from which the abnormal traffic is transmitted and which is obtained by the analysis of the abnormal traffic, and the attack-destination-network identifying unit identifies, when the abnormal traffic is detected, the attack destination network from the network-information storage unit on the basis of the network information indicating the destination device to which the abnormal traffic is to be transmitted and which is obtained by the analysis of the abnormal traffic.

In the invention set forth in claim 7, the network-information storage unit further stores therein filter information on a filter to which traffic monitoring information for detecting an abnormal traffic flowing through the network is applied in association with the network information, and the attack-destination-network identifying unit identifies, when the abnormal traffic is detected, the attack destination network from filter information and network information that are identified by the filter used to detect the abnormal traffic and stored in the network-information storage unit.

The invention set forth in claim 8 is a network monitoring method, connected to a network to which a plurality of devices are connected, suitable for detecting an abnormal traffic that attacks a network system, the network system being configured so that h the network and a plurality of other networks configured in the same manner as the network are interconnected. The network monitoring method includes: a network-information storage unit that stores therein network information for identifying a plurality of networks making up the network system, the network information being associated with the respective networks; an administrator-information storage unit that stores therein administrator information on administrators who manage the respective networks stored in the network-information storage unit, the administrator information being associated with the respective networks; an attack-source-network identifying step of monitoring traffics flowing through the network, and identifying, when an abnormal traffic is detected, an attack source network which is a source of an attack, from the network information stored in the network-information storage unit on the basis of attack source information indicating a source device from which the abnormal traffic is transmitted and which is specified by an analysis of the abnormal traffic; an attack-destination-network identifying step of identifying, when the abnormal traffic is detected, an attack destination network which is a destination of the attack, from the network information stored in the network-information storage unit on the basis of attack destination information indicating a destination device to which the abnormal traffic is to be transmitted and which is specified by the analysis of the abnormal traffic; and an attack notifying step of acquiring, from the administrator-information storage unit, administrator information corresponding to the attack source network identified at the attack-source-network identifying step, and notifying the attack source information with use of the acquired administrator information, the attack notifying step including acquiring, from the administrator-information storage unit, administrator information corresponding to the attack destination network identified by the attack-destination-network identifying step, and notifying the attack destination information with use of the acquired administrator information.

The invention set forth in claim 9 is a network monitoring program, connected to a network to which a plurality of devices are connected, causing a computer to perform detecting an abnormal traffic that attacks a network system, the network system being configured so that the network and a plurality of other networks configured in the same manner as the network are interconnected. The network monitoring program causes the computer to perform: a network-information storage unit that stores therein network information for identifying a plurality of networks making up the network system, the network information being associated with the respective networks; an administrator-information storage unit that stores therein administrator information on administrators who manage the respective networks stored in the network-information storage unit, the administrator information being associated with the respective networks; an attack-source-network identifying step of monitoring traffics flowing through the network, and identifying, when an abnormal traffic is detected, an attack source network which is a source of an attack, from the network information stored in the network-information storage unit on the basis of attack source information indicating a source device from which the abnormal traffic is transmitted and which is specified by an analysis of the abnormal traffic; an attack-destination-network identifying step of identifying, when the abnormal traffic is detected, an attack destination network which is a destination of the attack, from the network information stored in the network-information storage unit on the basis of attack destination information indicating a destination device to which the abnormal traffic is to be transmitted and which is specified by the analysis of the abnormal traffic; and an attack notifying step of acquiring, from the administrator-information storage unit, administrator information corresponding to the attack source network identified at the attack-source-network identifying step, and notifying the attack source information with use of the acquired administrator information, the attack notifying step including acquiring, from the administrator-information storage unit, administrator information corresponding to the attack destination network identified by the attack-destination-network identifying step, and notifying the attack destination information with use of the acquired administrator information.

Effect of the Invention

According to the invention of claims 1, 6, 8, and 9, network information identifying a plurality of networks making up a network system is stored in association with the respective plurality of networks; administrator information on administrators who manage the respective plurality of networks is stored in association with the respective plurality of networks stored; traffics flowing through a network are monitored; when an abnormal traffic is detected, an attack source network, a source of an attack, is identified from the stored network information on the basis of attack source information indicating a source device from which the abnormal traffic is transmitted, which is obtained by an analysis of the abnormal traffic; when the abnormal traffic is detected, an attack destination network, a destination of the attack, is identified from the stored network information on the basis of attack destination information indicating a destination device to which the abnormal traffic is to be transmitted, which is obtained by the analysis of the abnormal traffic; administrator information corresponding to the identified attack source network is acquired, and the attack source information is notified to an administrator of the attack source network with use of the acquired administrator information; administrator information corresponding to the identified attack destination network is acquired, and the attack destination information is notified to an administrator of the attack destination network with use of the acquired administrator information; thus, if a device managed by a provider of other network interconnected to the network is attacked, it is possible to quickly notify an attack source network and an attack destination network of attack information. Furthermore, the attack information is notified immediately, so the notified network administrator can implement measures against the attack quickly and accurately.

Furthermore, according to the invention of claim 2, since the attack source information and attack destination information obtained by the analysis of the abnormal traffic are notified to an administrator device of the network with use of stored administrator information of the network, an administrator of the network can recognize that the network may also be affected by the attack; as a result, it is possible to quickly implement measures such as a defense against the attack.

Moreover, according to the invention of claim 3, since the attack source information and attack destination information obtained by the analysis of the abnormal traffic are stored, attack information can be provided to other network provider without converting the attack information into some kind of transmission medium by accumulation of the attack information.

Furthermore, according to the invention of claim 4, since attack statistical information is created from the stored attack source information and attack destination information, attack information can be referred statistically; as a result, it is possible to utilize the attack information for the design of a new network system taking measures against attack and the like effectively.

Moreover, according to the invention of claim 5, when a request for browsing of the stored attack source information and attack destination information and statistical information created by the statistical-information creating means is received from an administrator device corresponding to stored administrator information, only information corresponding to a network managed by the administrator device is output to the administrator device after it is certified that the administrator device is an authenticated device; thus, an administrator of a network provider can browse attack information on attacks in a network to which the administrator belongs, and as a result, the administrator can take countermeasures and grasp a trend of attacks and the like.

Furthermore, according to the invention of claim 7, when an abnormal traffic is detected, an attack destination network is identified from filter information identified from a filter used to detect the abnormal traffic and network information; thus, it is possible to immediately notify an administrator of the occurrence of the attack before completion of the analysis.

BRIEF DESCRIPTION OF DRAWINGS

FIG. 3 is a diagram showing an example of information stored in a network information DB.

FIG. 4 is a diagram showing an example of information stored in an attack information DB.

FIG. 5 is a chart showing a distribution chart by type of attack created.

FIG. 10 is another diagram for explaining the conventional technology.

EXPLANATIONS OF LETTERS OR NUMERALS

Figure 1:
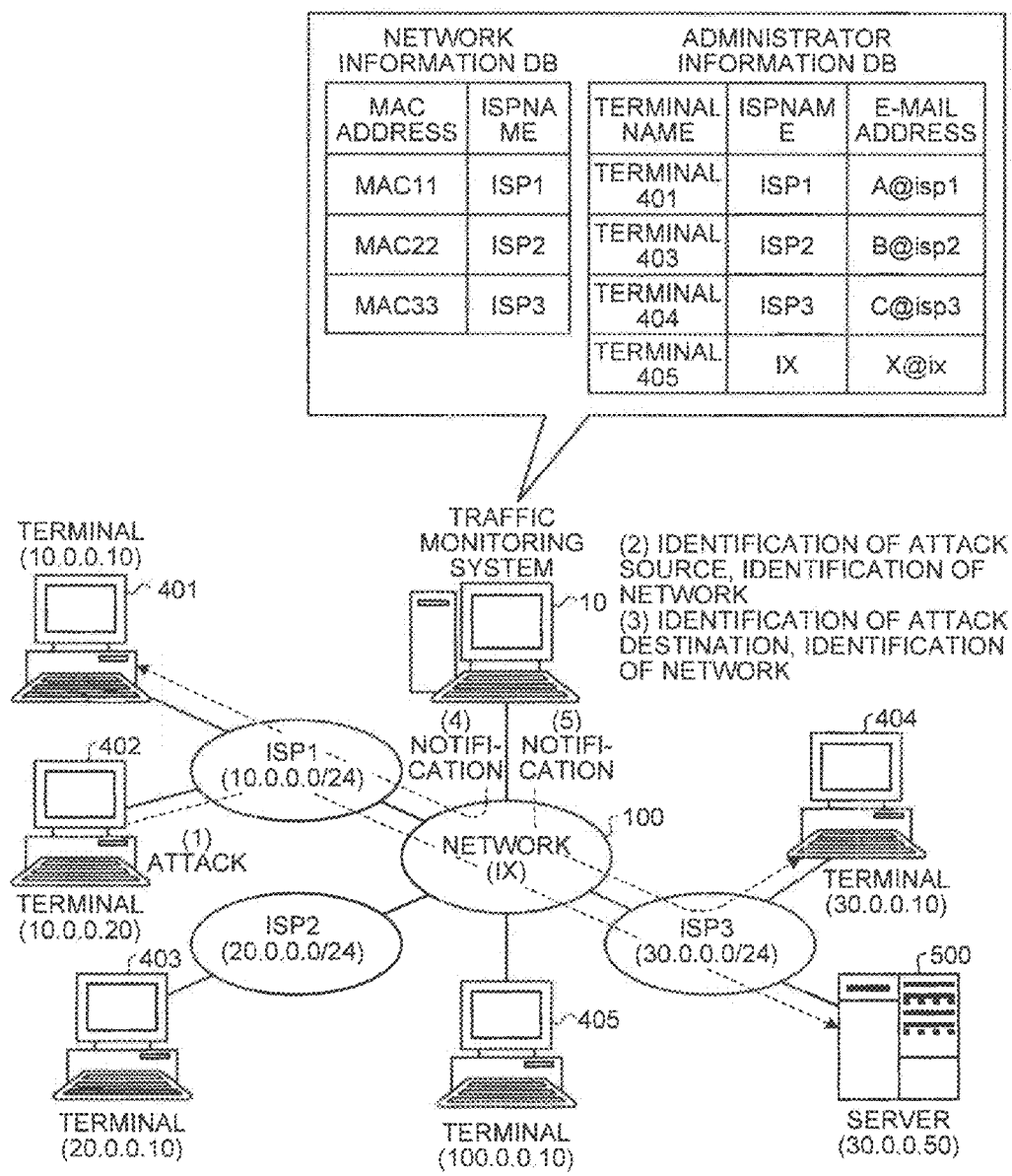
FIG. 1 is a diagram illustrating a configuration of an entire network system including a traffic monitoring system according to a first embodiment.

10 Traffic monitoring system
11 Communication control I/F unit
12 Display unit
20 Storage unit
21 Network information DB
22 Network-provider information table
23 Administrator information table
24 Network information table
25 Filter information table
26 Attack information DB
30 Control unit
31 Attack detecting/analyzing unit
32 Network-information identifying unit
33 Attack-information transmitting unit
34 Statistical-information creating unit
35 Attack-information browsing unit

BEST MODE(S) FOR CARRYING OUT THE INVENTION

Exemplary embodiments of a network monitoring apparatus, a network monitoring method, and a network monitoring program according to the present invention are explained in detail below with reference to the accompanying drawings. Incidentally, in what follows, key terms used in the present embodiment, an overview and characteristics of the network monitoring apparatus according to the present embodiment, a configuration and a processing flow of the network monitoring apparatus are explained in this order, and various variations of the present embodiment are explained at the end.

First Embodiment

Overview and Characteristics of Traffic Monitoring System

First, an overview and characteristics of a traffic monitoring system according to a first embodiment are explained with reference to FIG. 1. FIG. 1 is a diagram illustrating a configuration of an entire network system including the traffic monitoring system according to the first embodiment.

The "traffic monitoring system (corresponding to a "network monitoring apparatus" in claims)" used in the present embodiment is a computer device that detects an abnormal traffic indicating a DoS attack or a DDoS attack that occurs in the network system.

As shown in FIG. 1, this network system is made up of a network (an IX) 100 to which a traffic monitoring system 10 is connected and a network address "100.0.0.0/24" is assigned, an ISP1 assigned a network address "10.0.0.0/24", an ISP2 assigned a network address "20.0.0.0/24", and an ISP3 assigned a network address "30.0.0.0/24"; the ISPs 1 to 3 can be interconnected via the IX 100 so as to establish connection and communication with one another.

Furthermore, a terminal 401 assigned an IP address "10.0.0.10" and a terminal 402 assigned an IP address "10.0.0.20" are connected to the ISP1. Similarly, a terminal 403 assigned an IP address "20.0.0.10" is connected to the ISP2; a terminal 404 assigned an IP address "30.0.0.10" and a server 500 (a Web server) assigned an IP address "30.0.0.50" are connected to the ISP3; a terminal 405 assigned an IP address "100.0.0.10" is connected to the IX 100 in addition to the traffic monitoring system 10. Incidentally, to the networks, various terminals other than the above-described terminals connected to the respective networks (e.g., a DNS server, a mail server, a client terminal, and the like) are also connected, but description of these terminals is omitted.

Moreover, the IX 100, the ISP1, the ISP2, and the ISP3 shown here are run/managed by different companies from one another. In the present embodiment, it will be assumed that the terminal 402 is an administrator terminal of the ISP1, the terminal 403 is an administrator terminal of the ISP2, and the terminal 404 is an administrator terminal of the ISP3, and a case where the terminal 402 connected to the ISP1 feeds a large amount of traffics to the server 500 (a DDoS attack) is explained.

In such a configuration, in the network system in which the network 100 (the IX) to which a plurality of devices are connected and a plurality of other networks (the ISPs 1 to 3) configured in the same manner as the network 100 are interconnected, the traffic monitoring system 10 according to the first embodiment is connected to the network 100; an overview of the traffic monitoring system 10 is to detect an abnormal traffic attacking the network system; specifically, the traffic monitoring system 10 is mainly characterized in that when a device managed by a provider of other network interconnected to the network 100 is attacked, the traffic monitoring system 10 can quickly notify an attack source network and an attack destination network of attack information.

To explain the main characteristics specifically, the traffic monitoring system 10 stores network information identifying a plurality of networks making up the network system in a network information DB in association with the respective plurality of networks. To cite an example specifically, the network information DB stores therein "MAC11, ISP1", "MAC22, ISP2", "MAC33, ISP3", and the like as 'a "MAC address" identifying an edge router for connecting to the IX 100, a "name of an ISP" to which the edge router belongs'.

Then, the traffic monitoring system 10 stores administrator information on administrators who manage the respective plurality of networks in an administrator information DB in association with the respective plurality of networks stored in the network information DB. To cite an example specifically, the administrator information DB stores therein "terminal 401, ISP1, A@isp1", "terminal 403, ISP2, B@isp2", "terminal 404, ISP3, C@isp3", "terminal 405, IX, X@ix", and the like as 'a "name of a terminal" indicating an administrator device, a "name of an ISP" managed by the administrator device, an "e-mail address" indicating an address of the administrator device to which a notification is sent'.

In such a condition, the traffic monitoring system 10 monitors traffics flowing through the network; when an abnormal traffic is detected, the traffic monitoring system 10 identifies an attack source network, a source of an attack, from the network information stored in the network information DB on the basis of attack source information indicating a source device from which the abnormal traffic is transmitted, which is obtained by an analysis of the abnormal traffic (see (1) and (2) in FIG. 1).

To explain specifically with the example described above, the traffic monitoring system 10 monitors traffics flowing through the network; if a large amount of traffics are fed from the terminal 402, the traffic monitoring system 10 detects them as an abnormal traffic. Then, the traffic monitoring system 10 identifies "MAC address=MAC11", a MAC address of an edge router of the ISP1 to which an IP address of the source device (the terminal 402) belongs from "transmission source IP address=10.0.0.20 (the terminal 402)" and the like, attack source information contained in a packet that is the detected abnormal traffic. Subsequently, the traffic monitoring system 10 identifies the "ISP1" as an attack source network corresponding to the identified "MAC address=MAC11" by reference to the network information DB.

Subsequently, when the abnormal traffic is detected, the traffic monitoring system 10 identifies an attack destination network, a destination of the attack, from the network information stored in the network information DB on the basis of attack destination information indicating a destination device to which the abnormal traffic is to be transmitted, which is obtained by the analysis of the abnormal traffic (see (3) in FIG. 1).

To explain specifically with the example described above, the traffic monitoring system 10 identifies "MAC address=MAC33", a MAC address of an edge router of the ISP3 to which a destination IP address (the server 500) belongs from "destination IP address=30.0.0.50 (the server 500)" and the like, attack destination information contained in the packet that is the detected abnormal traffic. Subsequently, the traffic monitoring system 10 identifies the "ISP3" as an attack destination network corresponding to the identified "MAC address=MAC33" by reference to the network information DB.

Incidentally, as for a technique for detecting/analyzing an abnormal traffic and acquiring attack source information, such as an IP address of an attack source device and a MAC address of an edge router to which the attack source device is connected, and attack destination information, such as an IP address of an attack destination device and a MAC address of an edge router to which the attack destination device is connected, as shown in (1) to (3) in FIG. 1 described above, a publicly-known technique, such as an IDS (Intrusion Detection System) or an IPS (Intrusion Prevention System or Intrusion Protection System), is used, so detailed description of the technique is omitted here.

After that, the traffic monitoring system 10 acquires administrator information corresponding to the identified attack source network from the administrator information DB and notifies an administrator device of the attack source information with use of the acquired administrator information, and acquires administrator information corresponding to the identified attack destination network from the administrator information DB and notifies an administrator device of the attack destination information with use of the acquired administrator information (see (4) in FIG. 1).

To explain specifically with the example described above, the traffic monitoring system 10 acquires "terminal name=terminal 401, ISP name=ISP1, e-mail address A@isp1", administrator information corresponding to the identified attack source network "ISP1", from the administrator information DB, and notifies an administrator device of the attack source network "ISP1" of the attack source information "source IP address=10.0.0.20 (the terminal 402), etc." with use of the acquired e-mail address "e-mail address A@isp1". Similarly, the traffic monitoring system 10 acquires "terminal 404, ISP3, C@isp3", administrator information corresponding to the identified attack destination network "ISP3", from the administrator information DB, and notifies an administrator device of the attack destination network "ISP3" of the attack destination information "destination IP address=30.0.0.50 (the server 500), etc." with use of the acquired e-mail address "C@isp3".

After that, the traffic monitoring system 10 notifies an administrator device of the network of the attack source information and attack destination information obtained by the analysis of the abnormal traffic with use of administrator information of the network stored in the administrator information DB (see (5) in FIG. 1). To explain specifically with the example described above, the traffic monitoring system 10 notifies an administrator device of the network of the attack source information "source IP address=10.0.0.20 (the terminal 402), etc." and the attack destination information "destination IP address=30.0.0.50 (the server 500), etc.", which are obtained by the analysis of the abnormal traffic, with use of an e-mail address "X@ix" in "terminal 405, IX, X@ix", administrator information of the network stored in the administrator information DB.

In this manner, the traffic monitoring system 10 according to the first embodiment can identify an ISP and a device that are related to an attack, such as a DoS attack or a DDoS attack, from an abnormal traffic passing through the network (IX) 100; as a result, when a device managed by a provider of other network interconnected to the network 100 is attacked, as explained about the main characteristics above, the traffic monitoring system 10 can quickly notify an attack source network and an attack destination network of attack information.

[Configuration of Traffic Monitoring System]

Figure 2:
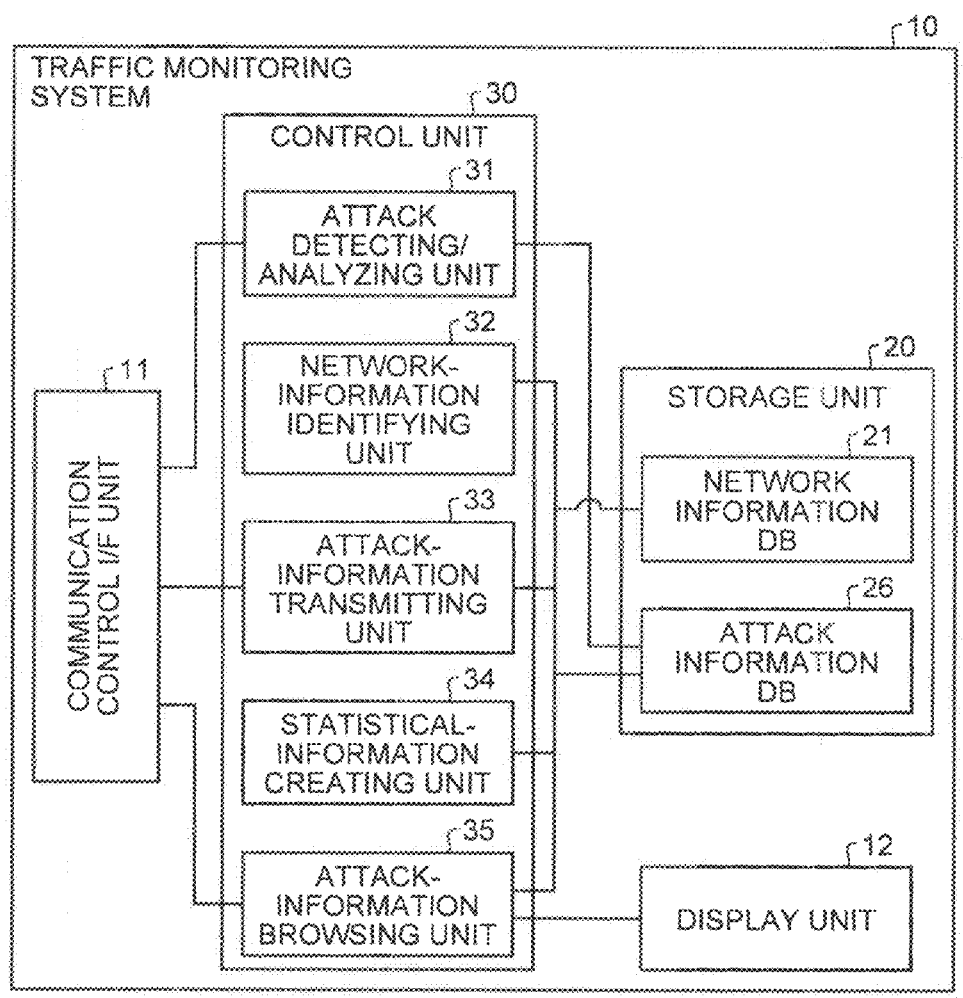
FIG. 2 is a block diagram illustrating a configuration of the traffic monitoring system according to the first embodiment.

Subsequently, a configuration of the traffic monitoring system shown in FIG. 1 is explained with reference to FIG. 2. FIG. 2 is a block diagram illustrating the configuration of the traffic monitoring system according to the first embodiment. As shown in FIG. 2, the traffic monitoring system 10 is made up of a communication control I/F unit 11, a display unit 12, a storage unit 20, and a control unit 30.

The communication control I/F unit 11 controls communications of various information exchanged with each of the connected devices. To cite an example specifically, the communication control I/F unit 11 receives a large amount of packets transmitted from the terminal 402 to the server 500 as a DDoS attack, and transmits attack source information or attack destination information to the terminal 401, the terminal 403, the terminal 404, or the terminal 405.

The display unit 12 is provided with a monitor (or a display, a touch panel) and a speaker, and outputs various information, for example, displays thereon attack source information, attack destination information, attack source network information, attack destination network information, etc. that are output from an attack-information browsing unit 35 to be described below.

The storage unit 20 stores therein data and programs, which are required for various processes performed by the control unit 30, and particularly includes, as ones closely associated with the present invention, a network information DB 21 and an attack information DB 26.

As shown in FIG. 3, the network information DB 21 includes a network-provider information table 22, an administrator information table 23, a network information table 24, and a filter information table 25, and stores therein network information identifying the plurality of networks making up the network system in association with the respective plurality of networks, administrator information on administrators who manage the respective plurality of networks in association with the respective plurality of networks, and the like with use of these tables. Incidentally, these tables are associated with one another. Furthermore, FIG. 3 shows an example of information stored in the network information DB, and information including various data and parameters can be arbitrarily changed unless otherwise specified. Moreover, the network information DB 21 corresponds to a "network-information storage means" and an "administrator-information storage means" in claims.

The network-provider information table 22 stores therein information identifying network providers who manage the IX 100, the ISPs 1 to 3, and the like. To cite an example specifically, the network-provider information table 22 stores therein "001, ISP1, Tokyo-to ○○, 03-xxx-xxxx, K01, N01", "002, ISP2, Osaka-fu xx, 06-xxx-xxxx, K02, N02", and the like as 'a "provider ID" uniquely assigned to a provider, a "provider name" indicating a name of the provider, an "address" indicating the location of the provider, a "phone number" indicating a phone number of the provider, an "administrator ID" indicating an administrator of the provider, a "network ID" identifying a network run by the provider' (see FIG. 3).

The administrator information table 23 stores therein information identifying administrators of providers of networks, such as the IX 100 and the ISPs 1 to 3. To cite an example specifically, the administrator information table 23 stores therein "K01, Tokkyo Taro, aaa, abc01, 01@sp1, TRUE (notification enabled)", "K02, Yamada Hanako, bbb, bjp02, 02@sp2, FALSE (notification disabled)", and the like as 'an "administrator ID" indicating an administrator of a provider, a "name" indicating a name of the administrator, a "login ID" that is uniquely assigned to the administrator and used when the administrator browses attack information or the like, a "password" that is specified by the administrator and used when the administrator browses attack information or the like, an "e-mail address" indicating an e-mail address of the administrator to which a notification is sent, an "e-mail notification flag" indicating whether or not to notify the administrator' (see FIG. 3). Incidentally, a plurality of administrator information is associated with respect to a single network provider. Furthermore, the login ID and the password are information requested to be input at the beginning when the administrator uses the traffic monitoring system 10, and the administrator can use the traffic monitoring system 10 only when the input login ID and password match those managed in the administrator information table 23.

The network information table 24 stores therein information identifying networks, such as the IX 100 and the ISPs 1 to 3. To cite an example specifically, the network information table 24 stores therein "N01, network, 192.168.0.0/24, F01", "N02, MAC, 00:11:22:AA:BB:CC, F02", and the like as 'a "network ID" uniquely assigned to a network, a "type of address" indicating a type of address assigned to the network, an "address" assigned to the network, a "filter ID" indicating a filter to be applied' (see FIG. 3).

Incidentally, as the type of address, there are "network address", "MAC address", and "VLAN ID"; the form of data stored in "address" is determined depending on the type of address. The term "network address" here means a portion used to indentify a subnet out of a bit string composing an IP address, and is expressed in a form of "network address/subnet mask", for example, like "192.168.0.0/24", and data using this expressive form is stored in "address". The term "MAC address" here is "00:11:22:AA:BB:CC", a unique physical address assigned to the network, and data using this expressive form is stored in "address". The term "VLAN ID" here is "VLAN ID=V01", an ID number identifying a VLAN (Virtual Local Area Network) that is a virtual network, and data using this expressive form is stored in "address".

The filter information table 25 stores therein traffic monitoring information used for detection of an abnormal traffic by an attack detecting/analyzing unit 31 to be described below. To cite an example specifically, the filter information table 25 stores therein "F01, traffic monitoring, HTTP•HTTPS (access to the server 500), 200 t/s (200 traffics per second)", "F02, traffic monitoring, TCP•UDP, 300 t/s (300 traffics per second)", and the like as 'a "filter ID" uniquely identifying a filter, a "filter name" indicating a name of the filter, a "filter condition" indicating a filtering condition of the filter, a "threshold" indicating a threshold in the filtering' that are used by the attack detecting/analyzing unit 31, which detects/analyzes an abnormal traffic, for example, by a technique similar to the IDS, the IPS, and the like (see FIG. 3).

The attack information DB 26 stores therein attack source information and attack destination information, which are obtained by an analysis of an abnormal traffic. To cite an example specifically, as shown in FIG. 4, the attack information DB 26 stores therein "1. TCP ALL, 2007/07/30 14:57:30, –, ○x provider, Kanto-area NW, detailed information button", "2. ICMP, 2007/07/28 21:54:00, 2007/07/28 22:03:23, ΔΔ corporation, * net, detailed information button", and the like as 'a "No" indicating an item number, a "type of attack" indicating an attacked type, an "attack start time" indicating a time when an attack is started, an "attack finish time" indicating a time when the attack is finished, a "network provider" indicating a provider of a network to which a terminal implementing the attack is connected, a "network" indicating the network to which the terminal implementing the attack is connected, a "detailed information button" for displaying detailed information of obtained attack destination information or attack source information and the like'.

When "detailed information" is clicked by an administrator or the like, a result of an analysis of each attack, i.e., information on who is under attack, who implements the attack, and the like is displayed with use of an IP address and the like. "No. 1" of which the field of attack finish is blank indicates that the attack has still continued without being finished. Incidentally, FIG. 4 shows an example of information stored in the attack information DB, and information including various data and parameters can be arbitrarily changed unless otherwise specified. Furthermore, the attack information DB 26 corresponds to an "attack-information storage means" in claims.

The control unit 30 has an internal memory for storing therein a control program such as an OS (Operating System), programs defining various processing procedures and the like, and required data, and particularly includes, as ones closely associated with the present invention, the attack detecting/analyzing unit 31, a network-information identifying unit 32, an attack-information transmitting unit 33, a statistical-information creating unit 34, and the attack-information browsing unit 35, and performs various processes with use of these units.

The attack detecting/analyzing unit 31 monitors traffics flowing through the network 100; when detecting an abnormal traffic, the attack detecting/analyzing unit 31 analyzes the abnormal traffic, and acquires attack source information indicating a source device from which the abnormal traffic is transmitted and attack destination information indicating a destination device to which the abnormal traffic is to be transmitted. Specifically, the attack detecting/analyzing unit 31 detects/analyzes the abnormal traffic by a technique similar to the IDS, the IPS, and the like; for example, if a flow rate of packets addressed to a specific target per unit time exceeds a "threshold" stored in the filter information table 25, the attack detecting/analyzing unit 31 determines that it is due to an attack, and analyzes the packets.

To explain specifically with the example described above, the attack detecting/analyzing unit 31 monitors traffics flowing through the network 100; if a large amount of traffics are fed from the terminal 402, the attack detecting/analyzing unit 31 detects them as an abnormal traffic. Then, the attack detecting/analyzing unit 31 identifies "MAC address=00:11:22:AA:BB:CC", a MAC address of an edge router of an ISP to which an IP address of the source device belongs, from "transmission source IP address=10.0.0.20" and the like, attack source information contained in the detected abnormal traffic, and stores the identified address in the attack information DB 26 to be described below. Furthermore, the attack detecting/analyzing unit 31 identifies "network address=192.168.0.0/24", a network address of an edge router of an ISP to which an IP address of the destination device belongs, from "transmission destination IP address=30.0.0.50" and the like, attack destination information contained in the detected abnormal traffic, and stores the identified address in the attack information DB 26 to be described below.

Incidentally, as for a technique for detecting/analyzing an abnormal traffic and acquiring attack source information, such as an IP address of an attack source device and a MAC address or a network address of an edge router to which the attack source device is connected, and attack destination information, such as an IP address of an attack destination device and a MAC address or a network address of an edge router to which the attack destination device is connected, a publicly-known technique, such as the IDS or the IPS, is used, so detailed description of the technique is omitted here. Here, there is described that a network address or a MAC address is identified as attack source information or attack destination information by the attack detecting/analyzing unit 31; in addition to these, for example, protocol information, date and time, and the like are identified.

The network-information identifying unit 32 identifies an attack source network, a source of an attack, from the network information stored in the network information DB 21 on the basis of attack source information indicating a source device from which an abnormal traffic is transmitted, which is obtained by an analysis of the abnormal traffic, and identifies an attack destination network, a destination of the attack, from the network information stored in the network information DB 21 on the basis of attack destination information indicating a destination device to which the abnormal traffic is to be transmitted, which is obtained by the analysis of the abnormal traffic.

To explain specifically with the example described above, the network-information identifying unit 32 identifies "network ID=N01" corresponding to "network address=192.168.0.0/24" (attack source information), a network address of an edge router of an ISP to which the attack source device is connected, identified by the attack detecting/analyzing unit 31 from the network information table 24 in the network information DB 21, and identifies "provider name=ISP1" corresponding to the identified "network ID=N01" from the network-provider information table 22. Then, the network-information identifying unit 32 notifies the attack-information transmitting unit 33 to be described below of the finally-identified "provider name=ISP1" as an attack source network that is a source of an attack.

Similarly, the network-information identifying unit 32 identifies "network ID=N02" corresponding to "MAC address=00:11:22:AA:BB:CC" (attack destination information), a MAC address of an edge router of an ISP to which the attack destination device is connected, identified by the attack detecting/analyzing unit 31 from the network information table 24 in the network information DB 21, and identifies "provider name=ISP2" corresponding to the identified "network ID=N02" from the network-provider information table 22. Then, the network-information identifying unit 32 notifies the attack-information transmitting unit 33 to be described below of the finally-identified "provider name=ISP2" as an attack destination network that is a destination of the attack. Incidentally, the network-information identifying unit 32 corresponds to an "attack-source-network identifying means" and an "attack-destination-network identifying means" in claims.

The attack-information transmitting unit 33 acquires administrator information corresponding to the attack source network identified by the network-information identifying unit 32 from the administrator information table 23 and notifies an administrator of the attack source network of the attack source information with use of the acquired administrator information, and acquires administrator information corresponding to the attack destination network identified by the network-information identifying unit 32 from the administrator information table 23 and notifies an administrator of the attack destination network of the attack destination information with use of the acquired administrator information.

To explain specifically with the example described above, the attack-information transmitting unit 33 acquires administrator information "administrator ID=K01, name=Tokkyo Taro, login ID=aaa, password=abc01, e-mail address=01@sp1, e-mail notification flag=TRUE" corresponding to "provider name=ISP1", the attack source network notified by the network-information identifying unit 32, from the administrator information table 23 in the network information DB 21. Then, since an e-mail notification flag in the acquired administrator information indicates "e-mail notification flag=TRUE", the attack-information transmitting unit 33 acquires attack source information (for example, an IP address of an attack source device, date and time, an IP address of an attack destination device, and the like) from the attack information DB 26, and notifies an administrator of a network to which the attack source device is connected of the acquired attack source information with use of the administrator information "e-mail address=01@sp1". In this example, the attack-information transmitting unit 33 notifies an administrator of the ISP1 (Tokkyo Taro) of the attack source information.

Furthermore, the attack-information transmitting unit 33 acquires administrator information "administrator ID=K02, name=Yamada Hanako, login ID=bbb, password=bjp02, e-mail address=02@sp2, e-mail notification flag=FALSE" corresponding to "provider name=ISP2", the attack destination network notified by the network-information identifying unit 32, from the administrator information table 23 in the network information DB 21. Then, since an e-mail notification flag in the acquired administrator information indicates "e-mail notification flag=FALSE", the attack-information transmitting unit 33 does not notify "Yamada Hanako", an administrator of the attack destination network, of the attack destination information (for example, an IP address of an attack destination device, date and time, an IP address of an attack source device, and the like).

Moreover, the attack-information transmitting unit 33 notifies an administrator device of the network 100 of the attack source information and attack destination information obtained by the analysis of the abnormal traffic with use of administrator information of the network 100 stored in the administrator information table 23. To explain specifically with the example described above, the attack-information transmitting unit 33 notifies an administrator device of the network 100 of the "attack source information" and "attack destination information" acquired by the attack detecting/analyzing unit 31 with use of administrator information of the network 100 stored in the administrator information table 23 in the network information DB 21. Namely, the attack-information transmitting unit 33 also notifies the network (IX) to which the traffic monitoring system 10, which has detected/analyzed the abnormal traffic, is connected of the "attack source information" and "attack destination information" that are acquired by the attack detecting/analyzing unit 31 and notified to the administrator of the attack source network and the administrator of the attack destination network. Incidentally, the attack-information transmitting unit 33 corresponds to an "attack information means" and a "network-administrator notifying means".

Figure 6:
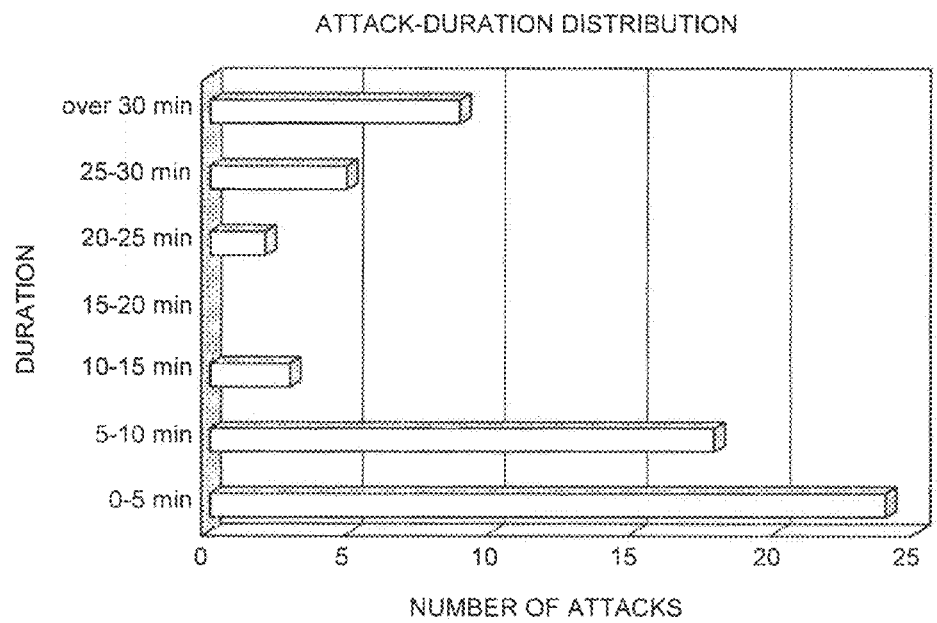
FIG. 6 is a chart showing an attack-duration distribution created.
Figure 7:
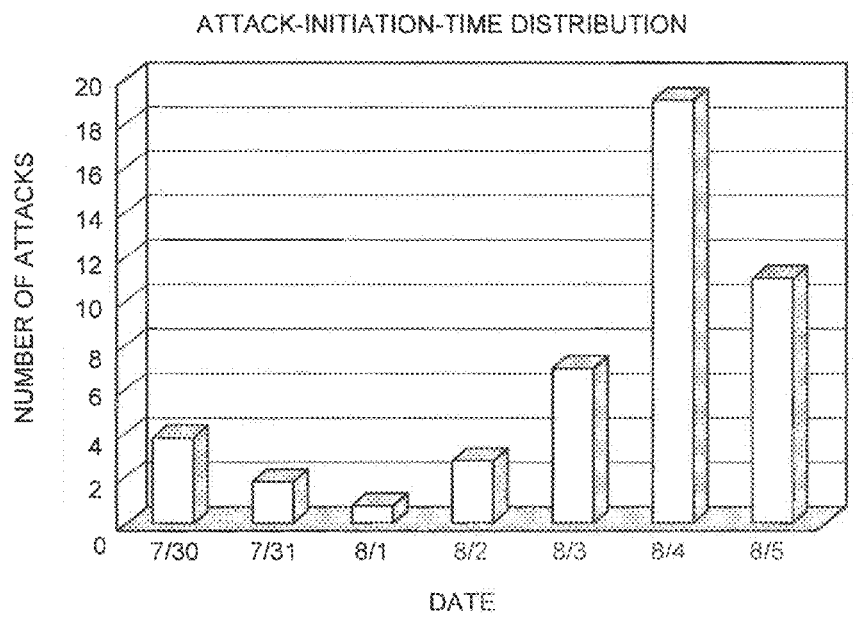
FIG. 7 is a chart showing an attack-initiation-time distribution created.

The statistical-information creating unit 34 creates attack statistical information from attack source information and attack destination information that are stored in the attack information DB 26. To explain specifically with the example described above, the statistical-information creating unit 34 creates a distribution chart by type of attack as shown in FIG. 5, an attack-duration distribution as shown in FIG. 6, an attack-initiation-time distribution as shown in FIG. 7, and the like from attack source information and attack destination information that are stored in the attack information DB 26, which stores therein various information on attacks that have occurred in the past or information on an attack that currently occurs. Furthermore, when receiving selections of statistical information that one wants to create, a statistical-information calculation period, and a graph subject to the statistics from an administrator of each network provider, the statistical-information creating unit 34 creates statistical information in accordance with the selections.

Moreover, when receiving an instruction from the attack-information browsing unit 35 to be described below, the statistical-information creating unit 34 creates statistical information shown in FIGS. 5 to 7, and outputs the created statistical information to the display unit 12. Incidentally, FIG. 5 is a chart showing a distribution chart by type of attack created, FIG. 6 is a chart showing an attack-duration distribution created, and FIG. 7 is a chart showing an attack-initiation-time distribution created. Furthermore, the statistical-information creating unit 34 corresponds to a "statistical-information creating means" in claims.

When the attack-information browsing unit 35 receives a request for browsing of attack source information, attack destination information, and network information that are stored in the attack information DB 26 and statistical information created by the statistical-information creating unit 34 from an administrator device corresponding to administrator information stored in the administrator information table 23, the attack-information browsing unit 35 outputs only information corresponding to a network managed by the administrator device to the administrator device after certifying that the administrator device is an authenticated device.

To explain specifically, when receiving a request for browsing of attack information from each administrator device of the network system via the communication control I/F unit 11, the attack-information browsing unit 35 outputs an authentication screen through which inputs of a "login ID" and a "password" are received to the display unit 12. Then, when the "login ID" and "password" received through the authentication screen match those stored in the administrator information table 23, the attack-information browsing unit 35 identifies a "provider name" stored in association with the "login ID" and the "password" from the network-provider information table 22, acquires attack information on the identified "provider" from the attack information DB 26, and outputs the acquired attack information to the display unit 12.

Furthermore, the attack-information browsing unit 35 outputs an instruction to the statistical-information creating unit 34 to create statistical information if need arises (an instruction operation by an administrator or the like, etc.). Incidentally, when the attack-information browsing unit 35 receives a browsing request from an administrator of the network (IX) 100 to which the traffic monitoring system 10 is connected, and certifies that the administrator is an authenticated device by the method described above, the attack-information browsing unit 35 acquires not only attack information on the IX 100 but also attack information on the entire network system from the attack information DB 26, and outputs the acquired attack information to the display unit 12. Incidentally, the attack-information browsing unit 35 corresponds to an "attack-information browsing means" in claims.

[Process by Traffic Monitoring System]

Figure 8:
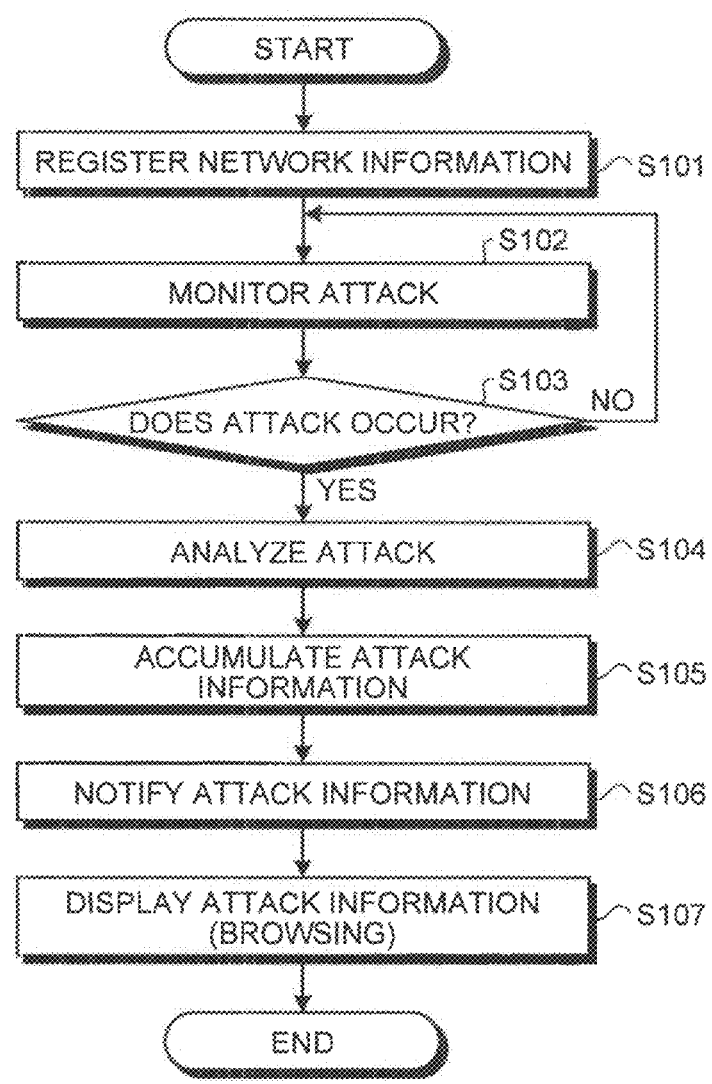
FIG. 8 is a flowchart illustrating a flow of an attack notifying process in the traffic monitoring system according to the first embodiment.
Figure 9:
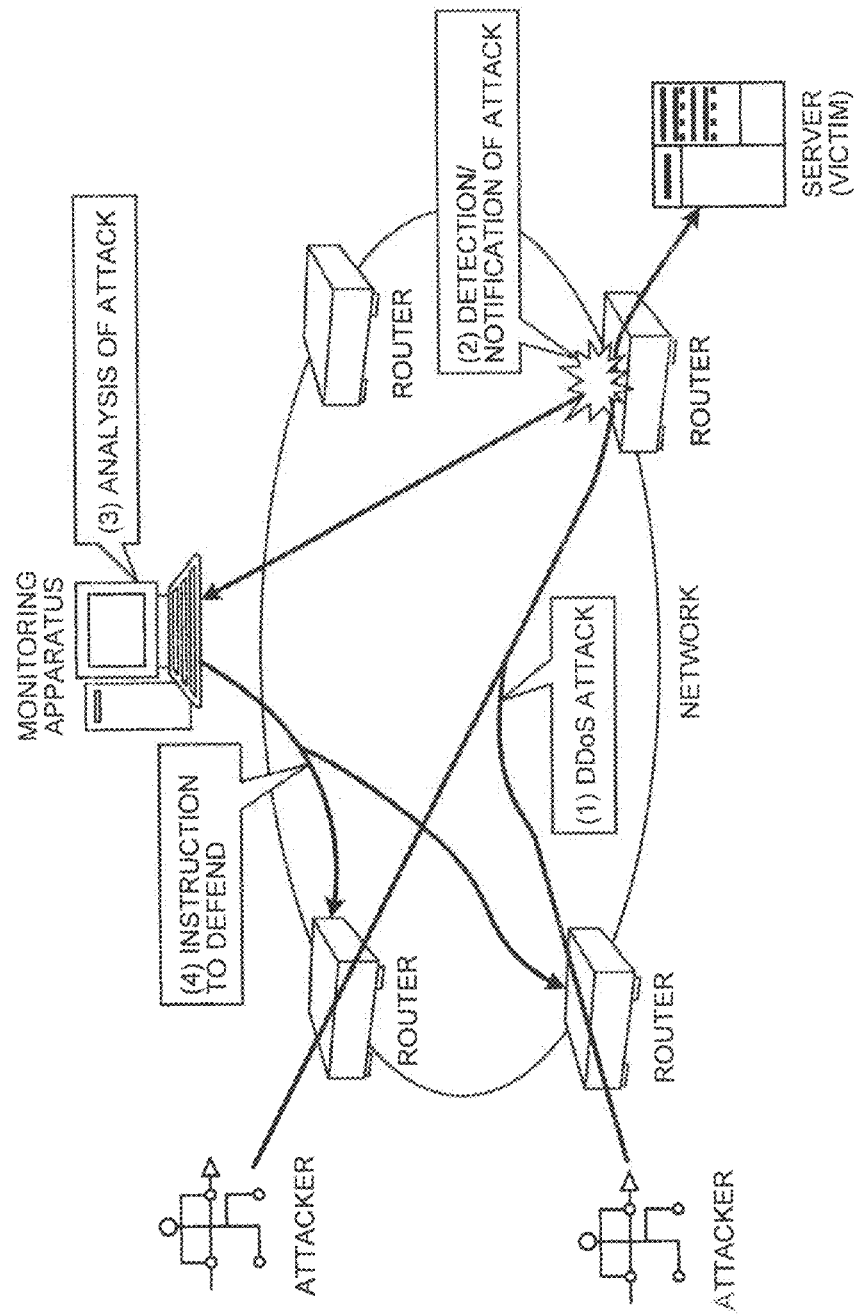
FIG. 9 is a diagram for explaining a conventional technology.

Subsequently, a process by the traffic monitoring system is explained with reference to FIG. 8. FIG. 8 is a flowchart illustrating a flow of an attack notifying process in the traffic monitoring system according to the first embodiment.

As shown in FIG. 8, the traffic monitoring system 10 registers information on a network subject to traffic monitoring (Step S101). Specifically, the traffic monitoring system creates the network-provider information table 22 for storing therein information identifying network providers; the administrator information table 23 for storing therein information identifying administrators of the network providers; the network information table 24 for storing therein information identifying networks; and the filter information table 25 for storing therein information used for the traffic monitoring, and stores created these tables in the network information DB 21.

Then, the traffic monitoring system 10 monitors traffics on the network stored (registered) in the network information DB 21 to monitor a network attack, such as a DoS attack and a DDoS attack (Step S102). To cite an example specifically, the attack detecting/analyzing unit 31 of the traffic monitoring system 10 monitors a network attack on the basis of the "filter condition" and "threshold" stored in the filter information table 25 in the network information DB 21.

After that, when detecting that an attack occurs (YES at Step S103), the traffic monitoring system 10 analyzes a packet related to the attack (Step S104). To explain specifically, when the attack detecting/analyzing unit 31 of the traffic monitoring system 10 detects traffics over the "threshold" corresponding to the "filter condition" stored in the filter information table 25 from traffics on the network, the attack detecting/analyzing unit 31 detects that an attack occurs. Then, the traffic monitoring system 10 analyzes packets of the traffics showing the attack, and acquires attack source information indicating a source of the attack and attack destination information indicating a destination of the attack.

Then, the traffic monitoring system 10 accumulates the acquired attack information in the attack information DB 26 (Step S105). To cite an example specifically, the attack detecting/analyzing unit 31 of the traffic monitoring system 10 accumulates/stores the attack source information and attack destination information acquired at Step S104 in the attack information DB 26.

Then, the traffic monitoring system 10 notifies an administrator of a network to which an attack source device is connected, an administrator of a network to which an attack destination device is connected, and an administrator of the network to which the traffic monitoring system 10 is connected of the acquired attack information (Step S106).

To cite an example specifically, the network-information identifying unit 32 of the traffic monitoring system 10 identifies an administrator of a network to which an attack source device is connected and an administrator of a network to which an attack destination device is connected from the administrator information table 23 on the basis of the attack source information and attack destination information acquired at Step S104. Then, the attack-information transmitting unit 33 of the traffic monitoring system 10 notifies the administrator of the network to which the attack source device is connected of the attack source information with use of an e-mail address included in information on the identified administrator, and notifies the administrator of the network to which the attack destination device is connected of the attack destination information with use of an e-mail address included in information on the identified administrator. Similarly, the traffic monitoring system 10 identifies an administrator of the network to which the traffic monitoring system 10 is connected from the administrator information table 23, and notifies the administrator of the network to which the traffic monitoring system 10 is connected of the attack source information and the attack destination information with use of an e-mail address included in information on the identified administrator.

After that, when receiving a request for browsing of the attack information, the traffic monitoring system 10 displays the attack information on an administrator device that has sent the request via the display unit 12 (Step S107).

To cite an example specifically, when the attack-information browsing unit 35 of the traffic monitoring system 10 receives a request for browsing of the attack source information, the attack destination information, and the network information that are stored in the attack information DB 26 and statistical information created by the statistical-information creating unit 34 from an administrator device corresponding to administrator information stored in the administrator information table 23, the attack-information browsing unit 35 outputs only information corresponding to a network managed by the administrator device to the administrator device after certifying that the administrator device is an authenticated device.

Advantageous Effects of First Embodiment

In this manner, according to the first embodiment, the network information DB 21 for storing therein network information identifying a plurality of networks making up a network system in association with the respective plurality of networks and the administrator information table 23 for storing therein administrator information on administrators who manage the respective plurality of networks in association with the respective plurality of networks are provided; traffics flowing through the network 100 are monitored; when an abnormal traffic is detected, an attack source network, a source of an attack, is identified from the network information stored in the network information DB 21 on the basis of attack source information indicating a source device from which the abnormal traffic is transmitted, which is obtained by an analysis of the abnormal traffic; when the abnormal traffic is detected, an attack destination network, a destination of the attack, is identified from the network information stored in the network information DB 21 on the basis of attack destination information indicating a destination device to which the abnormal traffic is to be transmitted, which is obtained by the analysis of the abnormal traffic; administrator information corresponding to the identified attack source network is acquired from the administrator information table 23, and the attack source information is notified to an administrator of the attack source network with use of the acquired administrator information; and administrator information corresponding to the identified attack destination network is acquired from the administrator information table 23, and the attack destination information is notified to an administrator of the attack destination network with use of the acquired administrator information; thus, if a device managed by a provider of other network interconnected to the network is attacked, it is possible to quickly notify an attack source network and an attack destination network of attack information. Furthermore, by being notified of the attack information immediately, a notified network administrator can implement measures against the attack quickly and accurately.

Furthermore, according to the first embodiment, since the attack source information and attack destination information obtained by the analysis of the abnormal traffic are notified to an administrator device of the network 100 with use of administrator information of the network 100 stored in the administrator information table 23, an administrator of the network 100 can recognize that the network 100 may also be affected by the attack; as a result, it is possible to quickly implement measures such as a defense against the attack.

Moreover, according to the first embodiment, since the attack source information and attack destination information obtained by the analysis of the abnormal traffic are stored in the attack information DB 26, attack information can be provided to other network provider without converting the attack information into some kind of transmission medium by accumulation of the attack information.

Furthermore, according to the first embodiment, since attack statistical information is created from the attack source information and attack destination information stored in the attack information DB 26, attack information can be referred statistically; as a result, it is possible to utilize the attack information for the design of a new network system taking measures against attack and the like effectively.

Moreover, according to the first embodiment, when a request for browsing of the attack source information and attack destination information stored in the attack information DB 26 and created statistical information is received from an administrator device corresponding to administrator information stored in the administrator information table 23, only information corresponding to a network managed by the administrator device is output to the administrator device after it is certified that the administrator device is an authenticated device; thus, an administrator of a network provider can browse attack information on attacks in a network to which the administrator belongs, and as a result, the administrator can take countermeasures and grasp a trend of attacks and the like.

Second Embodiment

The embodiment of the present invention is described above; alternatively, the present invention can be implemented in various different forms other than the above-described embodiment. Consequently, as shown below, different embodiments in forms of (1) a network identifying method, (2) a system configuration, etc., and (3) a program are explained.

(1) Network Identifying Method

For example, in the first embodiment, there is described a case where a network to which an attack source device or an attack destination device is connected is identified with use of a "network address" or a "MAC address" of an edge router of an ISP; however, the present invention is not limited to these addresses; as long as information can be acquired from a packet and can uniquely identify a network (for example, a VLAN ID, a network ID uniquely assigned to each network in a network system, etc.), any information can be used to identify a network to which an attack source device or an attack destination device is connected.

Furthermore, in the first embodiment, there is described a case where the network-information identifying unit 32 identifies a "network address" or a "MAC address" of an edge router of an ISP from a result of an analysis of an abnormal traffic by the attack detecting/analyzing unit 31, and identifies a network to which an attack source device or an attack destination device is connected. However, the present invention is not limited to this; an attack destination network can be identified without an analysis of an abnormal traffic when the attack detecting/analyzing unit 31 detects the abnormal traffic.

Specifically, the traffic monitoring system 10 monitors traffics flowing through the network 100; when an abnormal traffic is detected, the traffic monitoring system 10 can identify an attack destination network on the basis of which filter is used to detect the abnormal traffic.

To explain more specifically with reference to FIG. 3, as explained in the first embodiment, the attack detecting/analyzing unit 31 of the traffic monitoring system 10 performs traffic monitoring with use of filter information (traffic monitoring information) stored in the filter information table in FIG. 3. After that, it will be assumed that the attack detecting/analyzing unit 31 detects an abnormal traffic through "a filter of a filter ID=F01 (the first line of the filter information table 25 in FIG. 3)".

In this case, the network-information identifying unit 32 identifies "network ID=N01 (the first line of the network information table 24 in FIG. 3)", a network corresponding to the filter of the "filter ID=F01" through which the abnormal traffic is detected by the attack detecting/analyzing unit 31, and also identifies "provider ID=001 (the first line of the network-provider information table 22 in FIG. 3)", a network provider corresponding to "network ID=N01". Subsequently, the attack-information transmitting unit 33 acquires "administrator ID=K01 (the first line of the administrator information table 23 in FIG. 3)", administrator information corresponding to "provider ID=001" identified by the network-information identifying unit 32, and notifies a corresponding administrator of the occurrence of attack with use of the acquired administrator information, and the attack detecting/analyzing unit 31 analyzes the abnormal traffic. When being notified of the occurrence of attack, the administrator accesses to the traffic monitoring system, and refers to a result of the analysis of the abnormal traffic. Consequently, the occurrence of attack can be immediately notified to the administrator before completion of the analysis. Incidentally, attack source information is notified by the same method as in the first embodiment.

In this manner, the traffic monitoring system 10 can identify an attack source network without analyzing a detected abnormal traffic on the basis of which filter is used to detect the abnormal traffic. Here, information obtained by the analysis of the abnormal traffic by the attack detecting/analyzing unit 31 is exemplified although it is the same as in the first embodiment; for example, there are attack-destination IP address/port number, attack-source IP address/port number, a protocol used in an attack, a TCP flag indicating whether a TCP is subjected to the attack, interface information of routers of the network to which the traffic monitoring system 10 is connected, and the like.

(2) System Configuration, Etc.

Out of processes explained in the present embodiment, all or part of processes explained to be performed automatically can be performed manually, and all or part of processes explained to be performed manually can be automatically performed by publicly-known methods. In addition, processing procedures, control procedures, specific names, and information including various data and parameters shown in the above and the drawings (for example, those shown in FIGS. 3 and 4, etc.) can be arbitrarily changed unless otherwise specified.

The components of the devices shown in the drawings are functionally conceptual ones, and do not always have to be physically configured as shown in the drawings. Namely, the specific form of dispersion/integration of the devices is not limited to those shown in the drawings, and all or part of them can be functionally or physically dispersed or integrated in arbitrary units depending on various loads or use conditions (for example, the statistical-information creating unit 34 can be integrated with the attack-information browsing unit 35, etc.). Furthermore, all or any part of processing functions of processes performed in the devices are realized by a CPU and programs analyzed and executed by the CPU, or can be realized as hardware by wired logic.

(3) Program

The network monitoring method explained in the present embodiment can be realized by causing a computer, such as a personal computer or a workstation, to execute a program prepared in advance. The program can be distributed via a network such as the Internet. Furthermore, the program can be recorded on a computer-readable recording medium, such as a hard disk, a flexible disk (FD), a CD-ROM, an MO, or a DVD, so that the program can be executed by being read out from the recording medium by a computer.

INDUSTRIAL APPLICABILITY

As described above, the network monitoring apparatus, the network monitoring method, and the network monitoring program according to the present invention are useful in detecting an abnormal traffic that is connected to a network to which the network monitoring apparatus is connected and attacks a network system in the network system in which the network to which a plurality of devices are connected and a plurality of other networks configured in the same manner as the network are interconnected, and particularly, are suitable for quickly notifying an attack source network and an attack destination network of attack information when a device managed by a provider of other network interconnected to the network.

The invention claimed is:

1. A network monitoring apparatus, connected to a network to which a plurality of devices are connected, for detecting an abnormal traffic that attacks a network system, the network system being configured so that the network and a plurality of other networks configured in the same manner as the network are interconnected, the network monitoring apparatus comprising:

a network-information storage unit that stores therein network information for identifying a plurality of networks making up the network system, the network information being associated with the respective networks;

an administrator-information storage unit that stores therein administrator information on administrators who manage the respective networks stored in the network-information storage unit, the administrator information being associated with the respective networks;
an attack-source-network identifying unit that monitors traffics flowing through the network, the attack-source-network identifying unit identifying, when an abnormal traffic is detected, an attack source network which is outside the network and which is a source of an attack, from the network information stored in the network-information storage unit on the basis of attack source information indicating a source device from which the abnormal traffic is transmitted and which is specified by an analysis of the abnormal traffic;
an attack-destination-network identifying unit that identifies, when the abnormal traffic is detected, an attack destination network which is outside the network and which is a destination of the attack, from the network information stored in the network-information storage unit on the basis of attack destination information indicating a destination device to which the abnormal traffic is to be transmitted and which is specified by the analysis of the abnormal traffic; and
an attack notifying unit that acquires, from the administrator-information storage unit, administrator information corresponding to the attack source network identified by the attack-source-network identifying unit, and notifies the attack source information with use of the acquired administrator information, the attack notifying unit acquiring, from the administrator-information storage unit, administrator information corresponding to the attack destination network identified by the attack-destination-network identifying unit, and notifying the attack destination information with use of the acquired administrator information.

2. The network monitoring apparatus according to claim 1, further comprising a network-administrator notifying unit that notifies an administrator device of the network of the attack source information and attack destination information which are obtained by the analysis of the abnormal traffic with use of administrator information of the network stored in the administrator-information storage unit.

3. The network monitoring apparatus according to claim 1 or 2, further comprising an attack-information storage unit that stores therein the attack source information and attack destination information which are obtained by the analysis of the abnormal traffic.

4. The network monitoring apparatus according to claim 3, further comprising a statistical-information creating unit that creates attack statistical information from the attack source information and attack destination information which are stored in the attack-information storage unit.

5. The network monitoring apparatus according to claim 4, further comprising an attack-information browsing unit that outputs, when receiving a request for browsing of the attack source information and attack destination information which are stored in the attack-information storage unit and the statistical information created by the statistical-information creating unit from an administrator device corresponding to administrator information stored in the administrator-information storage unit, only information corresponding to a network managed by the administrator device to the administrator device after certifying that the administrator device is an authenticated device.

6. The network monitoring apparatus according to claim 1, wherein
the plurality of other networks in the network system are interconnected via the network so as to communicate with one another,
the network-information storage unit stores therein, as the network information, at least any one of a Media Access Control address, a network address, a Virtual Local Area Network identification, and an interface of a router, which are information for identifying the respective plurality of networks,
the attack-source-network identifying unit monitors traffics flowing through the network, and identifies, when the abnormal traffic is detected, the attack source network from the network-information storage unit on the basis of the network information indicating the source device from which the abnormal traffic is transmitted and which is obtained by the analysis of the abnormal traffic, and
the attack-destination-network identifying unit identifies, when the abnormal traffic is detected, the attack destination network from the network-information storage unit on the basis of the network information indicating the destination device to which the abnormal traffic is to be transmitted and which is obtained by the analysis of the abnormal traffic.

7. The network monitoring apparatus according to claim 1, wherein
the network-information storage unit further stores therein filter information on a filter to which traffic monitoring information for detecting an abnormal traffic flowing through the network is applied in association with the network information, and
the attack-destination-network identifying unit identifies, when the abnormal traffic is detected, the attack destination network from filter information and network information that are identified by the filter used to detect the abnormal traffic and stored in the network-information storage unit.

8. The network monitoring apparatus according to claim 1, wherein the network-information storage unit, the administrator-information storage unit, and the attack notifying unit are located within a single computing device on the network.

9. A network monitoring method, connected to a network to which a plurality of devices are connected, suitable for detecting an abnormal traffic that attacks a network system, the network system being configured so that the network and a plurality of other networks configured in the same manner as the network are interconnected, the network monitoring method comprising:
storing, in a network-information storage unit, network information for identifying a plurality of networks making up the network system, the network information being associated with the respective networks;
storing, in an administrator-information storage unit, administrator information on administrators who manage the respective networks stored in the network-information storage unit, the administrator information being associated with the respective networks;
an attack-source-network identifying step of monitoring traffics flowing through the network, and identifying, when an abnormal traffic is detected, an attack source network which is outside the network and which is a source of an attack, from the network information stored in the network-information storage unit on the basis of attack source information indicating a source device from which the abnormal traffic is transmitted and which is specified by an analysis of the abnormal traffic;

an attack-destination-network identifying step of identifying, when the abnormal traffic is detected, an attack destination network which is outside the network and which is a destination of the attack, from the network information stored in the network-information storage unit on the basis of attack destination information indicating a destination device to which the abnormal traffic is to be transmitted and which is specified by the analysis of the abnormal traffic; and an attack notifying step of acquiring, from the administrator-information storage unit, administrator information corresponding to the attack source network identified at the attack-source-network identifying step, and notifying the attack source information with use of the acquired administrator information, the attack notifying step including acquiring, from the administrator-information storage unit, administrator information corresponding to the attack destination network identified by the attack-destination-network identifying step, and notifying the attack destination information with use of the acquired administrator information.

10. The network monitoring method according to claim 9, wherein the network-information storage unit and the administrator-information storage unit are located, and the attack notifying step is performed, within a single computing device on the network.

11. A non-transitory computer-readable storage medium storing computer-readable instructions thereon, which, when executed by a computer connected to a network to which a plurality of devices are connected, cause the computer to perform a network monitoring method for detecting an abnormal traffic that attacks a network system, the network system being configured so that the network and a plurality of other networks configured in the same manner as the network are interconnected, the network monitoring method comprising:

storing, in a network-information storage unit, network information for identifying a plurality of networks making up the network system, the network information being associated with the respective networks;

storing, in an administrator-information storage unit, administrator information on administrators who manage the respective networks stored in the network-information storage unit, the administrator information being associated with the respective networks;

an attack-source-network identifying step of monitoring traffics flowing through the network, and identifying, when an abnormal traffic is detected, an attack source network which is outside the network and which is a source of an attack, from the network information stored in the network-information storage unit on the basis of attack source information indicating a source device from which the abnormal traffic is transmitted and which is specified by an analysis of the abnormal traffic;

an attack-destination-network identifying step of identifying, when the abnormal traffic is detected, an attack destination network which is outside the network and which is a destination of the attack, from the network information stored in the network-information storage unit on the basis of attack destination information indicating a destination device to which the abnormal traffic is to be transmitted and which is specified by the analysis of the abnormal traffic; and an attack notifying step of acquiring, from the administrator-information storage unit, administrator information corresponding to the attack source network identified at the attack-source-network identifying step, and notifying the attack source information with use of the acquired administrator information, the attack notifying step including acquiring, from the administrator-information storage unit, administrator information corresponding to the attack destination network identified by the attack-destination-network identifying step, and notifying the attack destination information with use of the acquired administrator information.

12. The non-transitory computer-readable storage medium according to claim 11, wherein the network-information storage unit and the administrator-information storage unit are located, and the attack notifying step is performed, within a single computing device on the network.

* * * * *